United States Patent Office 3,042,540
Patented July 3, 1962

3,042,540
WATER DISPERSIBLE PIGMENTS AND THE PRODUCTION THEREOF
Samuel Cabot, 241 Perkins St., Boston, Mass.
No Drawing. Filed Jan. 30, 1956, Ser. No. 562,014
5 Claims. (Cl. 106—308)

The present invention relates to water dispersible pigments, to the method of making the same, and to the coloring of fabrics of natural fibres therewith.

The general objective of the invention is to enable mineral and other pigments to be so dispersed in water that they may be employed to color fabrics composed of animal or vegetable fibres. To attain this objective, reference is made to Letters Patent of the United States, No. 1,662,999, dated March 20, 1928, and No. 1,791,119, dated February 3, 1931.

These patents were concerned with colloidal dispersions of mineral and other pigments in hydrocarbons and oils. In accordance with the present invention, the step is added to the teachings of said patents, of saponifying the pigment colloids with alkalies such as sodium or potassium hydroxides, carbonates and other soluble basic salts to provide that the saponified oil mass is water dispersible.

Such a dispersion, when of the concentration required for a desired depth of color, is applied to the fabric by any acceptable technique and after the excess coloring matter has been removed as by squeezing, the fabric is treated with a dilute solution of aluminum sulphate, calcium chloride or any other suitably diluted water soluble salt or acid to render the pigment dispersion insoluble in water and to fix the color in the fibres. After washing and drying, it will be found that the fibres are colored to the desired shade and that the color is light fast and non-fading and that fabric, so colored, is water repellent to a marked degree and protected from weakening and deterioration on exposure to sunlight.

It will be noted that the invention is adapted for use with any pigment that is unaffected by the saponifying agent or the agent used to render insoluble and fix the pigment dispersion in the fibres. Umber, ocher, lithopone, white lead, carbon black, and metal oxide pigments are satisfactory in use.

As one example of the invention, 100 parts of red iron oxide, or of any other suitable pigment except carbon black, is masticated with fifty parts of polymerized linseed oil of the consistency of molasses. While the oil of this mass can be saponified, it is preferred to thin the mass with a volatile hydrocarbon for which purpose mineral naphtha is well adapted for use and in the example, 50 parts would be preferred. The oil of the thinned mass is then saponified, following usual procedures, with say seven parts of sodium hydroxide, dissolved in 20 parts of water.

The saponified liquid is water dispersible and the amount of water used for this purpose is dependent on the depth of color desired in any particular coloring operation in which usual dyeing practice may be followed as to application and removal of excess liquid. The fabric is then treated with an agent rendering the pigment dispersion insoluble in water and fixed in the fibres. In the example given, a 5% solution of aluminum sulphate was used following which the fabric was rinsed and dried.

As another example, 25 parts of carbon black, more in the case of any other of the usable pigments, and 100 parts of polymerized menhaden oil, the consistency of molasses, were masticated together and thinned with 50 parts of mineral naphtha. The polymerized oil was then saponified with 23.5 parts of potassium carbonate dissolved in 50 parts of water. The procedure as to dilution for color, etc., as above detailed was followed except that in place of the aluminum sulphate a solution of calcium chloride was used. This solution was a 10% solution but it could have been considerably stronger or weaker.

In general, a polymerized vegetable or animal drying oil can be saponified with various alkalies of which sodium and potassium hydroxide and carbonates are the best adapted for commercial uses. These saponifying agents may be be used interchangeably and in amounts necessary for complete saponification.

While the examples are specific, as to the agency for rendering insoluble in water and fixing the dispersed pigments, to aluminum sulphate and calcium chloride, other suitable dilute solutions of water soluble salts of metals whose soaps are water insoluble and water soluble acids can be used interchangeably therewith in amounts necessary for complete precipitation.

What I therefore claim and desire to secure by Letters Patent is:

1. A water dispersible pigment comprising an alkali metal soap body of a saponified polymerized drying oil of a consistency, in an unthinned state, approximately that of molasses and pigment particles of colloidal fineness dispersed therein.

2. A water dispersible pigment comprising an alkali metal soap body of a saponified polymerized drying oil of a consistency, in an unthinned state, approximately that of molasses, and pigment particles of colloidal fineness dispersed therein and of the group that are not affected by alkalies and weak acids.

3. The method of colloidally dispersing pigment particles in water comprising the steps of dispersing said particles to colloidal fineness in a polymerized drying oil of a consistency, in an unthinned state, approximately that of molasses, and then saponifying the oil of the mass to form an alkali metal soap.

4. The method of colloidally dispersing pigment particles in water comprising the steps of dispersing said particles to colloidal fineness in a polymerized drying oil of a consistency, in an unthinned state, approximately that of molasses, thinning the pigment and oil mass with a hydrocarbon, and then saponifying the thinned oil of the mass to form an alkali metal soap.

5. The method of colloidally dispersing pigment particles in water comprising the steps of dispersing said particles from the group that are not affected by alkalies and weak acids to colloidal fineness in polymerized drying oil of a consistency, in an unthinned state, approximately that of molasses, thinning the pigment and oil mass with a hydrocarbon, and then saponifying the thinned oil to form an alkali metal soap.

References Cited in the file of this patent

UNITED STATES PATENTS

| | | |
|---|---|---|
| 690,868 | Menzies | Jan. 7, 1902 |
| 1,946,053 | Baldwin | Feb. 6, 1934 |
| 1,946,054 | Baldwin | Feb. 6, 1934 |
| 2,234,091 | Sharples | Mar. 4, 1941 |

FOREIGN PATENTS

| | | |
|---|---|---|
| 272,585 | Great Britain | June 13, 1927 |
| 4,870 | Great Britain | of 1893 |